(12) United States Patent
Trenary

(10) Patent No.: US 6,805,657 B2
(45) Date of Patent: Oct. 19, 2004

(54) BODY-CONNECTED BIKE

(76) Inventor: Justin W. Trenary, 6170 Browning, Newkirk, OK (US) 74647

( * ) Notice: Subject to any disclaimer, the term of this patent is extended or adjusted under 35 U.S.C. 154(b) by 0 days.

(21) Appl. No.: 10/288,182

(22) Filed: Nov. 5, 2002

(65) Prior Publication Data
US 2004/0087416 A1 May 6, 2004

(51) Int. Cl.$^7$ ................................................ A63B 71/00
(52) U.S. Cl. ........................... 482/51; 482/68; D21/423; 280/87.01
(58) Field of Search .............................. 482/51, 68, 79, 482/80, 114, 132; D21/423; 280/87.01

(56) References Cited

U.S. PATENT DOCUMENTS

| | | | | |
|---|---|---|---|---|
| 1,668,623 A | * | 5/1928 | Avril | 280/87.021 |
| 2,448,427 A | * | 8/1948 | Gordon | 280/32.5 |
| 2,484,494 A | * | 10/1949 | Ferguson | 2/24 |
| 2,615,722 A | * | 10/1952 | Johnson | 280/7.14 |
| 4,029,329 A | * | 6/1977 | Chambers | 280/87.021 |
| 4,595,197 A | | 6/1986 | Hagstrom et al. | |
| 4,930,796 A | * | 6/1990 | Harrod | 280/87.021 |
| 5,004,229 A | | 4/1991 | Lind | |
| 5,378,215 A | * | 1/1995 | Harkins | 482/67 |
| 5,380,021 A | * | 1/1995 | Doherty | 280/32.5 |
| 5,427,391 A | | 6/1995 | Cooper | |
| 5,447,483 A | * | 9/1995 | Liang | 482/132 |
| 5,725,224 A | | 3/1998 | Kerr | |
| 5,839,740 A | * | 11/1998 | Seeger | 280/87.021 |
| 6,053,853 A | | 4/2000 | Hinds | |
| D447,188 S | * | 8/2001 | Lan | D21/423 |

OTHER PUBLICATIONS

Kinetica game drawings from website (http://www.us.playstation.com/games) Images dowloaded Jan. 10, 2002.

* cited by examiner

Primary Examiner—Nicholas D. Lucchesi
Assistant Examiner—Tam Nguyen
(74) Attorney, Agent, or Firm—Kenneth S. Watkins, Jr.

(57) ABSTRACT

A body-connected bike comprises a front roller assembly [101] and a separate rear roller assembly [103]. The front roller assembly comprises a single front wheel [105] and handgrips [107A, 107B] on either side of the front wheel. The rear roller assembly comprises a single rear wheel [121] supporting lower leg support platforms [115A, 115B] on either side of the rear wheel. A rider [102] utilizes the apparatus by grasping the front handgrips [107A, 107B] with the lower legs secured by straps [119A, 119B] to the rear roller assembly. The body of the rider acts as a connecting means between the front and rear roller assemblies and allows high-performance riding, exercise and competition.

20 Claims, 5 Drawing Sheets

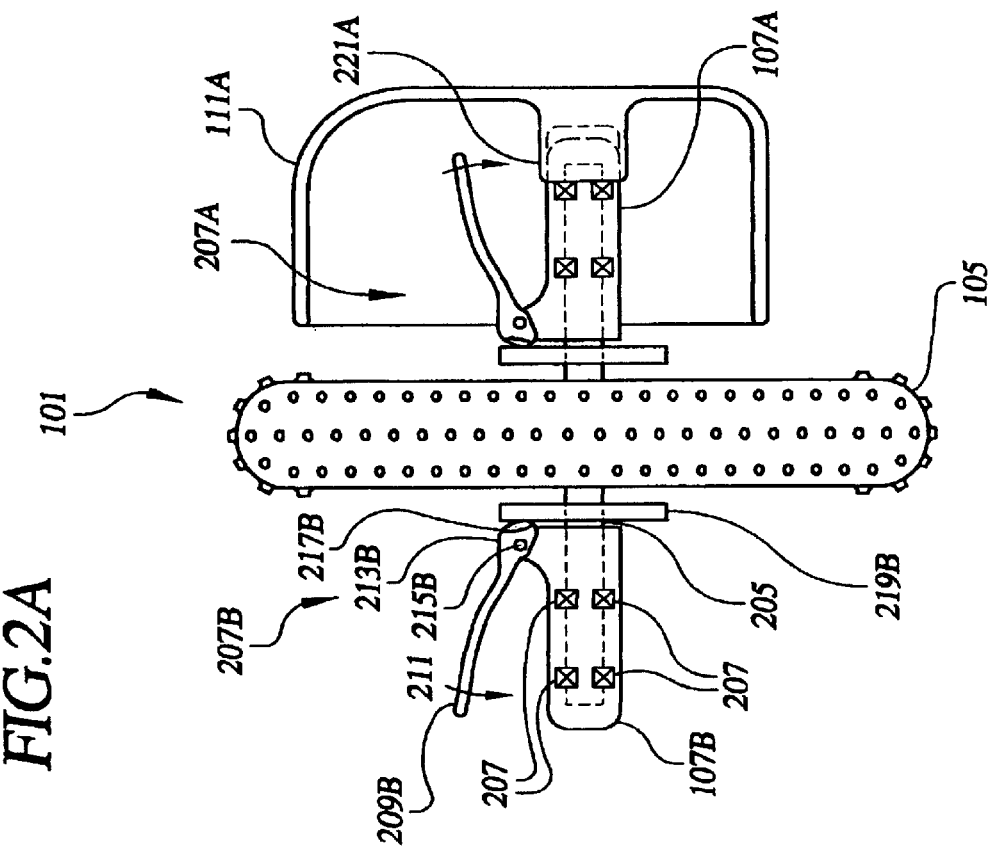
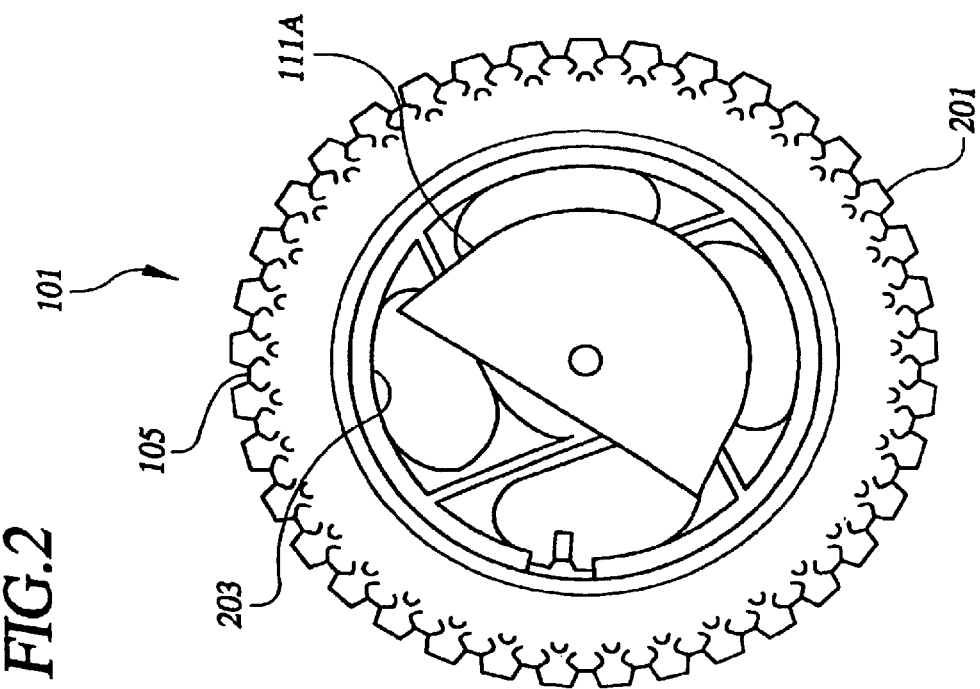

BODY-CONNECTED BIKE

FIELD OF THE INVENTION

The present invention relates to wheeled vehicles and, more particularly, to multi-component wheeled vehicles.

BACKGROUND OF THE INVENTION

Downhill vehicle riding has constantly been a popular activity for sport, competition and fitness. Downhill vehicles include conventional bikes, specialized bikes, three and four wheeled cars and carts, scooters, and skateboards. Each of these vehicles offers various advantages for different applications.

Many individuals look for new equipment and methods in which to display quickness, strength, physical stamina and good reflexes. Novel downhill racers also provide new markets for equipment manufacturers, wholesalers, retailers, event organizers, and fitness/competition trainers.

OBJECTS AND SUMMARY OF THE INVENTION

Therefore, an object of the present invention is to provide a novel body-connected bike having two individual and separate components.

Another object of the present invention is to provide a body-connected bike which utilizes new skills for downhill riding and for competition.

Yet another object of the present invention is to provide a body-connected bike which provides braking action to the front and rear roller assemblies.

Another object of the present invention is to provide a body-connected bike which utilizes a single front wheel and a single rear wheel.

Still another object of the present invention is to provide a body-connected bike which is simple and low in cost.

The body-connected bike comprises a separate front roller assembly and a separate rear roller assembly. The front roller assembly, grasped by the hands of the rider, supports the upper body of the rider and the rear roller assembly, engaging the lower legs of the rider, provides support to the lower body of the rider. The rider is normally in a "crawl" position with the front arms extended, and acts as the "connector" between the front and rear roller assemblies. The rider may also be in a more prone position, or even one of the components may be temporarily raised from the riding surface.

In the preferred embodiments, the front roller assembly comprises a single front wheel supporting handgrips on either side of the front wheel. In the preferred embodiments, the handgrips are parallel to the rotational axis of the front wheel, and in the most preferred embodiments, the handgrips are operably connected to an axle of the front wheel. Optional hand brakes on the handgrips engage a friction pad against a disc attached to the wheel, or alternatively, the rim or tire of the front roller assembly. A hand guard, attached to the front roller assembly protects the hands of the rider when mounting, dismounting, and tight maneuvers.

In the preferred embodiments, the rear roller assembly comprises a single rear wheel supporting a lower leg support platform on either side of the rear wheel. In the preferred embodiments, the lower leg supports are elongated and orientated longitudinally with the rolling direction of the rear wheel. The lower leg support platforms engage the lower legs of the rider and provide support for the lower body portion. Leg straps secure the lower legs to the lower leg support platforms, and knee and ankle supports provide additional support, stability and comfort to the rider. A leg or knee-activated brake engages the rear wheel to provide braking. A fender above the rear wheel provides protection for the rider from contact with the rear wheel.

In operation, the rider secures the lower leg straps to secure the lower legs to the rear wheel roller assembly and grasps the handgrips of the front roller assembly. The front roller assembly serves as a steering and stabilizing assembly and is held between the rider's forearms. In this manner, the rider's arms act as the "forks" of a conventional bicycle when riding the apparatus.

The rear roller assembly supports the majority of the rider's weight during normal riding. In the preferred embodiments, the leg supports are positioned so that the rear wheel is maintained between the rider's legs and the axle of the rear wheel is behind the rider's knees and forward of the ankles. Knee or leg-activated rear brakes allow the rider to control the speed of the apparatus by inward pressure of the knees or legs. The torso of the body acts as a connector between the front and rear roller assemblies during use.

The flexibility afforded by the two separate assemblies allows extreme maneuverability during downhill riding and racing. By practice, the rider can perform unusual maneuvers, and even temporarily raise the front and rear roller assemblies during riding.

In the preferred embodiments, the front and rear roller assemblies utilize a single wheel on each assembly. In a normal riding mode, the single front and rear wheels make continuous contact with the riding surface. Alternative embodiments may utilize side or "trainer" wheels outboard of the respective rear and/or front wheel(s) to add stability when training on the apparatus. Such wheels may be permanently installed, or installed or removed by removable fasteners. In the preferred embodiments, side or auxiliary wheels are of smaller diameter compared to the main wheels so that they are not in contact with the riding surface during normal riding.

BRIEF DESCRIPTION OF THE DRAWINGS

These and other features, aspects and advantages of the present invention will become better understood with regard to the following description, appended claims and accompanying drawings where:

FIG. 2 is a front elevation drawing of the front roller assembly showing the single front wheel, and front hand guard;

FIG. 2A is a top plan view of the front roller assembly showing details of the front handgrips, handgrip bearings, and front hand brake assemblies;

DESCRIPTION OF THE PREFERRED EMBODIMENTS

The following is a description of the preferred embodiments of a wheeled apparatus for transporting a rider that utilizes a separate front roller assembly and a separate rear roller assembly.

Figure 1:
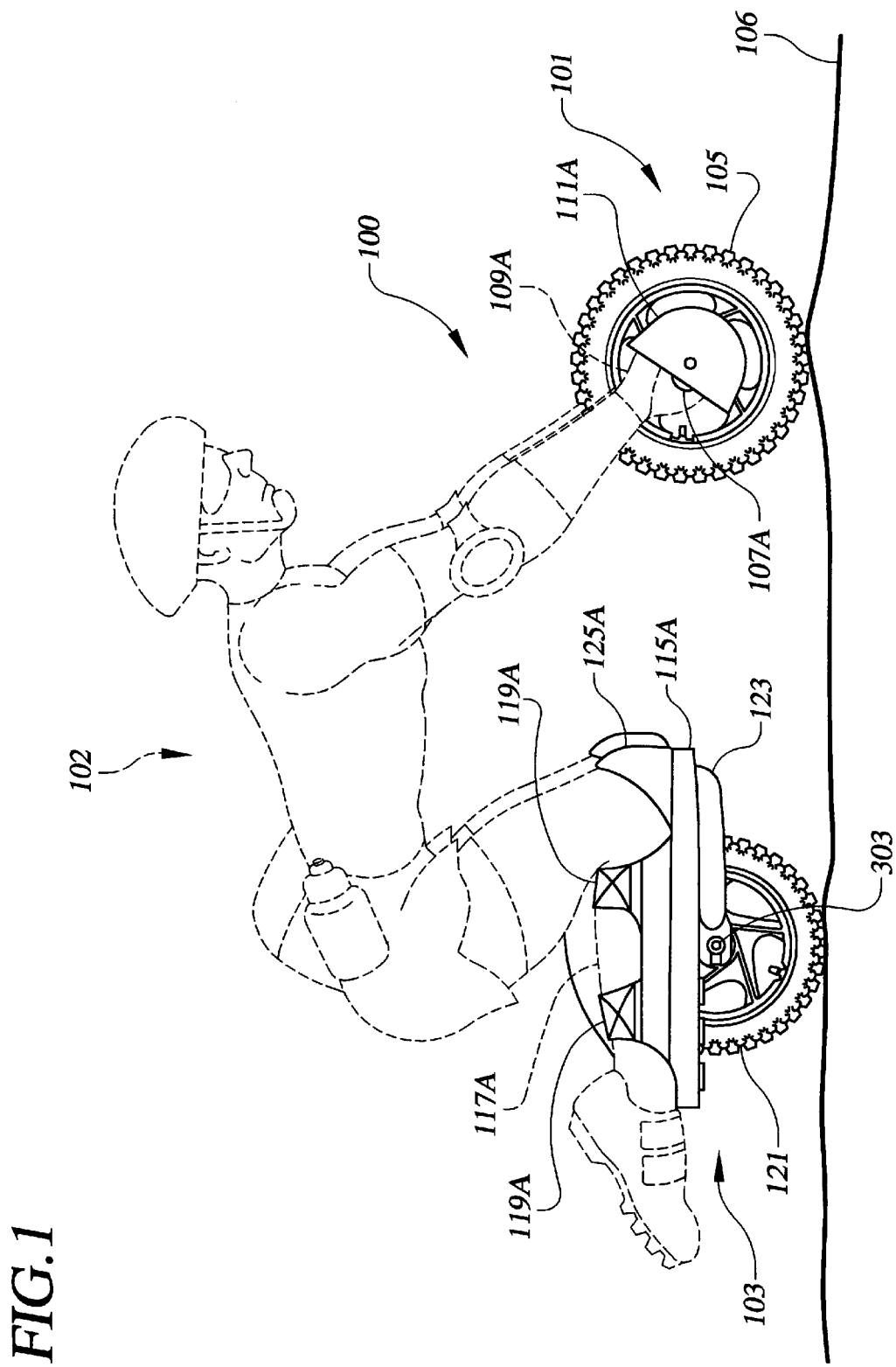
FIG. 1 is a side elevation drawing of the front and rear roller assemblies of the present invention in use by a rider, shown in phantom lines, in the normal riding position, and the front hand guard shown cut back to show the handgrips.

FIG. 1 is a side elevation drawing of a rider mounted on the wheeled apparatus 100 consisting of a front roller assembly 101 and a separate and independent rear roller assembly 103. Right side components are shown in the drawing, but left side components are similar. Front wheel 105 of front roller assembly 101 is a conventional pneumatic tire providing rolling support from riding or ground surface 106. Handgrips 107A and 107B provide a front support means for the hands 109A, 109B of rider 102. Hand guards 111A, 111B protect the rider's hands 109A, 109B from contact with ground surface 106 when mounting, dismounting, turning and maneuvering.

Rear roller assembly 103 provides the rear support means for rider 102. Longitudinal leg support platforms 115A, 115B provide support to the front or shin portions of the rider's legs 1117A, 117B. Leg and ankle straps 119A, 119B secure legs 117A, 117B to leg support platforms 115A, 115B. Leg strap 119A may also be a single-piece leg strap such as that shown in FIG. 3.

In the preferred embodiments, leg support platforms 115A, 115B and rear wheel 121 are connected to, and supported by, frame 123. In other embodiments, rear leg supports 115A, 115B are directly mounted to, and supported from, rear wheel 121. Rear wheel 121 of rear roller assembly is a conventional pneumatic tire providing rolling support from ground surface 106. Knee pads 125A, 125B provide additional support and protection for the riders legs 117A, 117B.

FIG. 2 is a side elevation drawing of front roller assembly 101. FIG. 2A is a top view of the front roller assembly. In the preferred embodiments, front wheel 105 is a conventional pneumatic tire 201 mounted on a metal or plastic rim 203. In other embodiments, front wheel 105 utilizes a solid rubber or plastic tire, or the tire and rim may be an integral wheel made of plastic or metal.

Handgrips 107A, 107B are supported from wheel 105 by axle 205. In the preferred embodiments, handgrips 107A and 107B are supported from axle 205 by hand grip bearings 207 to allow rotation of axle 205 when the handgrips are grasped by the rider. In other embodiments, handgrips 107A and 107B are fixed to axle 205 and conventional wheel bearings (as in rear wheel bearings 401 of FIG. 4) allow wheel 105 rotation when axle 205 is held stationary.

In the preferred embodiments, a front wheel brake such as front brakes 207A, 207B allows the rider to apply the desired amount of braking to the front roller assembly. The left side front brake 207B is described in the following section and right side front brake is similar. Pulling hand lever 209B in direction 211 rotates cam portion 213B about pivot 215B and engages friction pad 217B against disc 219B. Disc 219B is rotationally fixed to axle 205, or alternatively, to wheel 105. A spring in a bottom recess portion of handgrip 107B (similar to spring 435A of FIG. 4A) biases hand lever 209B in a direction opposite 211 to release braking when hand lever 209B is released.

Sleeve portion 221A of hand guard 111A provides an interference fit with handgrip 107A to secure hand guard 111A to the assembly. Alternatively, a mechanical fastener is used to attach hand guard 111A to handgrip 107A. A left side hand guard (not shown) is similarly mounted to left handgrip 107B.

Figure 3:
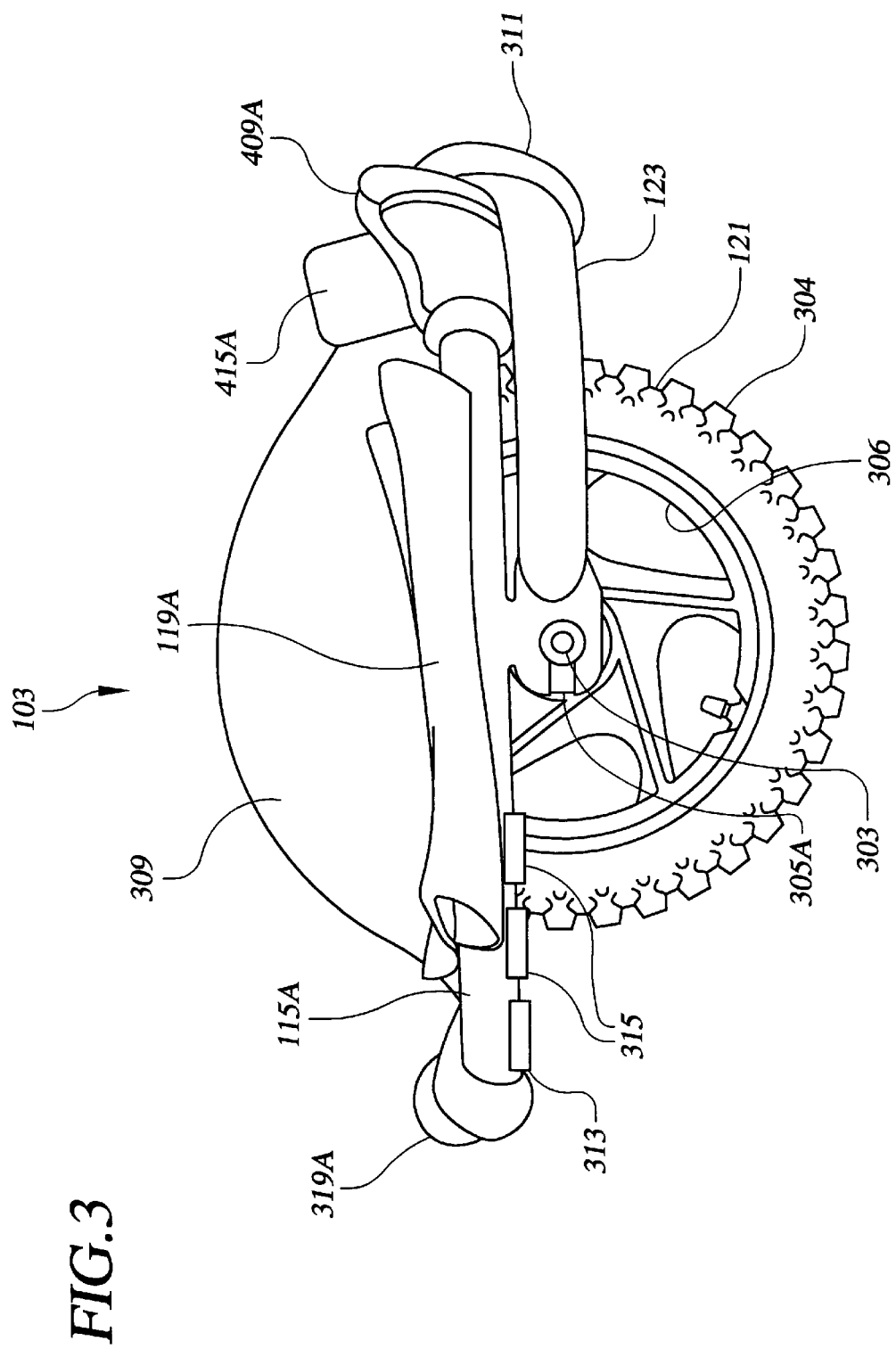
FIG. 3 is a side elevation drawing of the rear roller assembly showing the single rear wheel axle supported by a frame between the knee pad and the ankle support.
Figure 4:
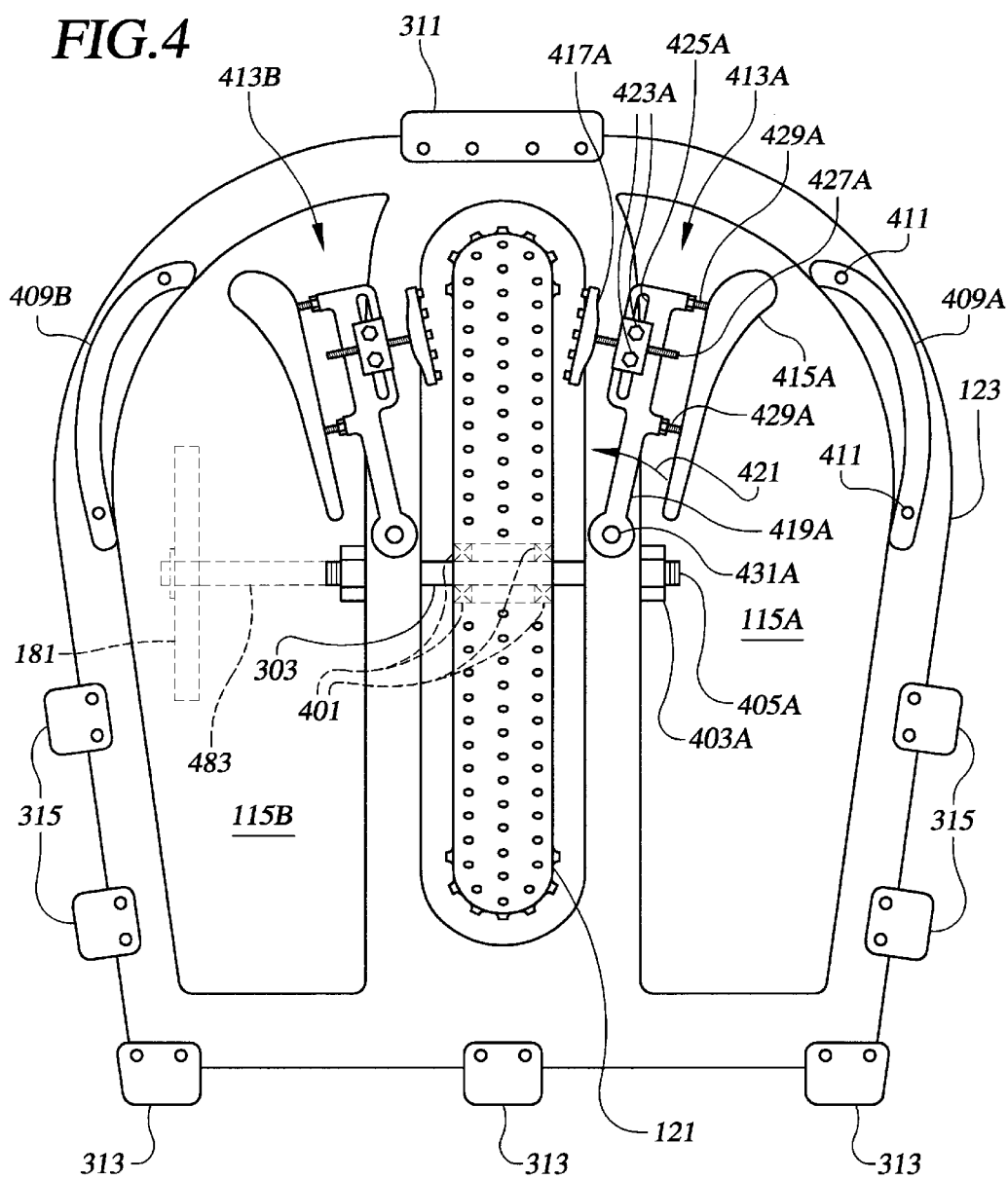
FIG. 4 is a top plan view of the rear roller assembly showing details of the rear wheel bearing assembly, rear knee-activated brakes, and front and rear bumpers.

FIG. 3 is a side elevation drawing and FIG. 4 is a top view of rear roller assembly 103. Right side components are described below, left side components are similar. The assembly comprises a frame 123 supporting rear axle 303. Rear wheel bearings 401 rotatably support rear wheel 121 on axle 303. Nuts 403A secure threaded portion 405A of axle 303 to frame axle slot 305A. In the preferred embodiments, rear wheel 121 is a conventional pneumatic tire 304 mounted on a metal or plastic rim 306. In other embodiments, rear wheel 121 utilizes a solid rubber or plastic tire, or the tire and rim may be an integral wheel made of plastic or metal.

Longitudinal leg supports 115A, 115B are attached to frame 123 for supporting the knees, ankles and lower leg shin portion of the rider. Knee pads 409A, 409B, fixed by fasteners 411 provide additional support and protection for the rider's lower legs. Straps 119A, 119B secure the lower leg of rider 102 to longitudinal leg supports 115A, 115B. In the preferred embodiments, knee pads 409A, 409B are padded. Ankle pad 319A, 319B provide additional support and comfort for the lower leg of rider 102.

In the preferred embodiments, rear brakes 413A, 413B provide a speed control means for rear roller assembly 103. Rear brake knee actuator 415A, attached to rear brake pad 417A via rear brake pivot arm 419A provides a means for the rider to apply braking by inward pressure from the knee. Upon inward pressure by the rider on knee brake actuator 415A, pivot arm 419A rotates inward in direction 421, pressing brake pad 417A against rim 306 rear wheel 121. Clamp bolts 423A allow longitudinal adjustment of brake pad 417A position along slot 425A of pivot arm 419A. Threaded rod 427A of brake pad 417A allows lateral adjustment of the pad for desired clearance to wheel 121. Adjustment bolts 429A provide lateral and angular adjustment of knee actuator 415A.

Figure 4A:
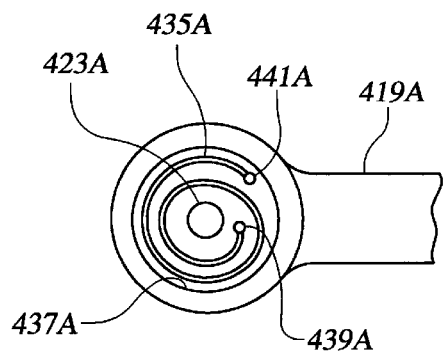
FIG. 4A is a detail drawing of the rear brake pivot arm and spring.

FIG. 4A is a detail drawing looking at the bottom of pivot arm 419A pivot end. Pivot pin 431A, inserted in bushing 433A of FIG. 4A allows pivoting of arm 419A. Spiral spring 435A in recess portion 437A provides pivot arm 419A bias in a direction opposite of arrow 421. The first end 439A of pivot spring 435A is fixed in pivot recess 437A, and the second end 441A engages a hole (not shown) in frame 123.

Fender 309, attached to frame 123 of rear roller assembly 103 by mechanical fasteners, covers the upper portion of wheel 121 and protects the rider from contact with wheel 121. Fender 309 also protects the rider from water, mud or foreign objects thrown from wheel 121. Front bumper 311, rear bumpers 313, and side bumpers 315, attached to frame 123 provide rider and equipment protection from contact and abrasion from the riding surface. Fender 309, knee pads 411A, 411B, leg straps 119A, 119B, and leg pad 319A, 319B are omitted from FIG. 4 for clarity in the drawings.

Figure 5:
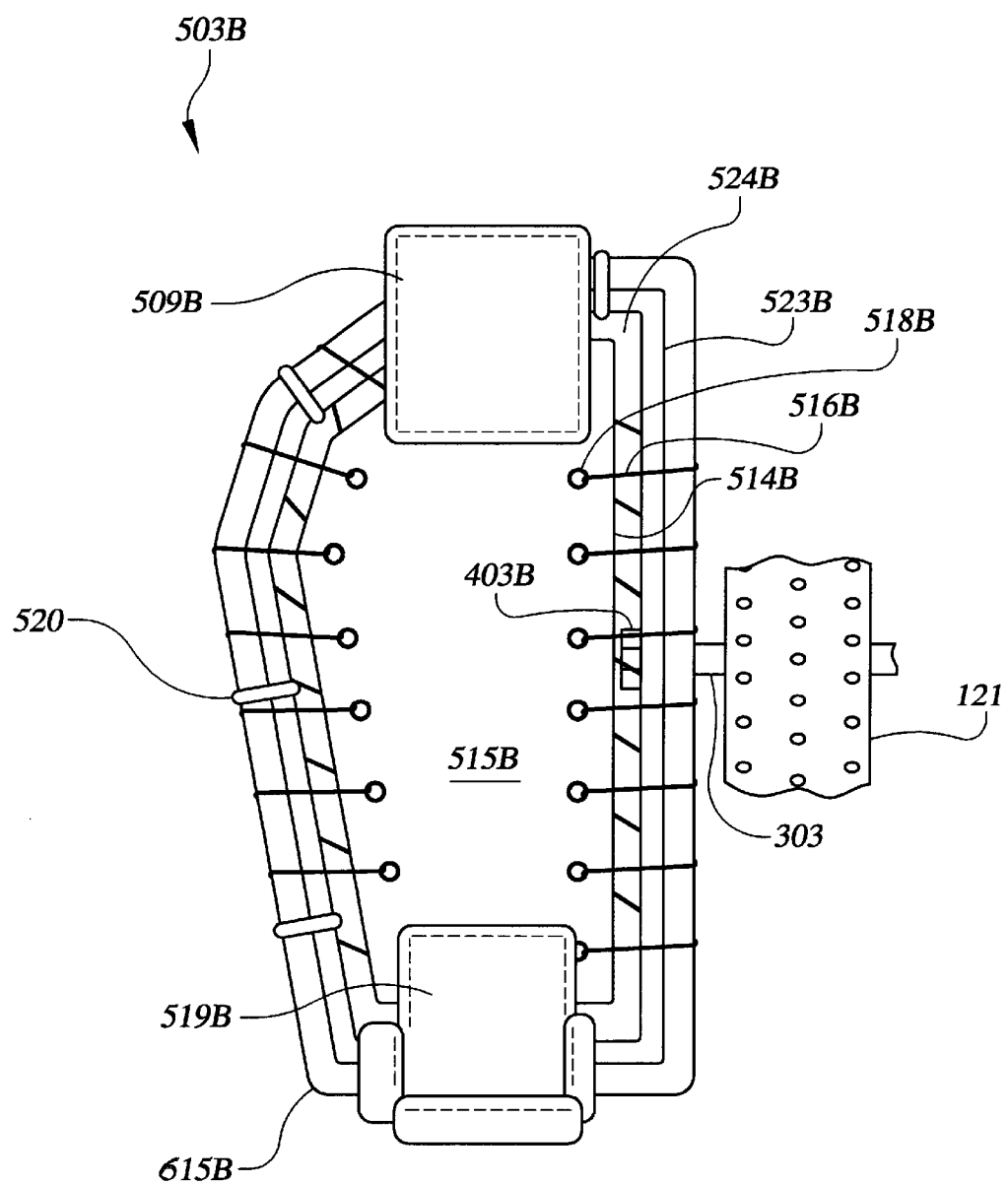
FIG. 5 is a top plan view of an alternative embodiment of the rear roller assembly with leg platforms suspended within the frame of the rear roller assembly.

FIG. 5 is an alternative embodiment of the left rear roller frame and leg support platform 503B. Only the left side of the frame and leg platform are shown in this drawing, but the right side is similar. Axle 303 and fastener 403B attach axle 303 of rear wheel 121 to frame 523B of the rear roller assembly. Frame 523B comprises an opening 524B, into which a suspended fabric 514B is stretched. Strap 516B, wrapped between holes 518B of fabric 514B and frame 523B stretch and retain fabric 514B within frame 523B. Fabric 514B serves as a leg support platform 515B of the rear roller assembly. Knee pad 509B and ankle pad 519B are attached to fabric 514B by sewing, buttons, bonding, or other mechanical fasteners. The use of suspended fabric 514B and the resilience of the fabric material and strap 516B provide shock absorption to the legs, knees and ankles of the rider, and improve the comfort of the assembly. One piece or separate leg and ankle straps such as those of FIGS. 1 and 3 attach the rider's legs to leg support platform 515B. Rear brake components (similar to those in FIG. 4) are omitted for clarity in the drawing.

Fabric 514B, knee pad 509B, and ankle pad 519B may be a woven fabric of natural or synthetic fibers, or they may be of a reinforced or non-reinforced polymeric sheet material. Padding, such as foam padding may be sewn into fabric 514B, knee pad 509B, and ankle pad 519B to provide additional shock absorption and comfort for the rider. In other embodiments, knee pad 509B and/or ankle pad 519B are fabricated, molded, or otherwise constructed as a separate component and attached to fabric 514B or frame 523B by mechanical fasteners. A fastening means such as bands or straps 520 attach rubber bumpers 615B to the outside frame portion of the apparatus.

In the preferred embodiments of the present invention, frame 123 is constructed of steel or aluminum tube. In other embodiments, frame 123 is made of a high strength plastic. Front and rear axles are made of steel. Brake structural components are made of aluminum or steel. The leg support platforms may be made of plastic or fabric. The fender, handgrips and hand guards are made of plastic. Bumpers and friction pads are made of hard natural or synthetic rubber. In still other embodiments, rollers or small wheels may be substituted for the bumpers of FIGS. 3 and 4. Leg straps are made of fabric or fabric reinforced plastic.

The wheels of the front and roller assembly are smaller than typical bicycle wheels and larger than typical skateboard or roller blade wheels. In the preferred embodiments, the front and rear wheels are less than 16" in diameter. In the more preferred embodiments, the front and rear wheels are less than 14" in diameter. In the preferred embodiments, the front and rear wheels are greater than 6" in diameter. In the more preferred embodiments, the front and rear wheels are greater than 8" in diameter. In the most preferred embodiments, the front and rear wheels are approximately 12" in diameter.

In alternative embodiments, trainer wheels such as trainer wheel 181 of FIG. 4 provide additional support and stability of the rear roller assembly during training periods, or for other uses. An extended axle 483 provides support for wheel 181. In other embodiments, wheel 181 may be rotatably supported from an outside portion of frame 123. Training wheels may also be added to front roller assembly 101 in a similar manner.

Accordingly, the reader will see that the BODY-CONNECTED BIKE provides a simple and challenging vehicle for pleasure, exercise and competition. The device provides the following additional advantages:

The apparatus affords stability and high speed due to low center of gravity and low wind resistance due to the low rider position;

Both front and rear brakes may be utilized;

The apparatus affords great variation in use; and

The apparatus is simple and low in cost.

Although the description above contains many specifications, these should not be construed as limiting the scope of the invention but merely providing illustrations of some of the presently preferred embodiments of this invention. For example, different types of brakes may be added such as caliper brakes or coaster brakes. Or, a front fender may be incorporated in the hand guards, etc. Thus the scope of the invention should be determined by the appended claims and their legal equivalents, rather than by the examples given.

I claim:

1. A wheeled apparatus for transporting a rider, the apparatus comprising a separate front roller assembly and a separate rear roller assembly such that the roller assemblies are only coupled together by the rider's body during exercise the front roller assembly comprising a front wheel and a handgrip portion disposed on both sides of, and operatively supported from, the front wheel.

2. The wheeled apparatus of claim 1 wherein the handgrip portion is supported by a bearing engaging an axle through the front wheel.

3. The wheeled apparatus of claim 1 wherein a first handgrip portion comprises a brake operably attached to the front wheel.

4. The wheeled apparatus of claim 3 wherein the brake comprises a friction element disposed on the handgrip engageable with a complementary friction element operatively connected to the front wheel.

5. The wheeled apparatus of claim 4 wherein the handgrip comprises a hand lever operably attached to the friction element.

6. The wheeled apparatus of claim 5 wherein the friction element is a friction pad and the complementary friction element is a disc operatively attached to the front wheel.

7. The wheeled apparatus of claim 1 comprising a hand guard attached to a first handgrip portion.

8. The wheeled apparatus of claim 1 wherein the rear roller assembly comprises a fender enclosing a top portion of the rear wheel.

9. The wheeled apparatus of claim 1 wherein the rear roller assembly comprises a leg strap disposed on both sides of the rear wheel for securing the lower leg shin portion to the leg support portion.

10. The wheeled apparatus of claim 1 wherein the rear roller assembly comprises a knee pad disposed on both sides of the rear wheel for securing the lower leg shin portion to the leg support portion.

11. The wheeled apparatus of claim 1 wherein the rear roller assembly comprises a rear wheel brake.

12. The wheeled apparatus of claim 11 wherein the rear wheel brake comprises a friction element operably connected to a leg brake actuator disposed on both sides of the rear wheel and a complementary friction element operatively connected to the rear wheel.

13. The wheeled apparatus of claim 12 wherein the leg brake actuator is a knee actuator operatively connected to a friction pad engageable with the complementary friction element.

14. The wheeled apparatus of claim 13 wherein the complementary friction element is a rim portion of the rear wheel.

15. A wheeled apparatus for transporting a rider, the apparatus comprising a separate front roller assembly and a separate rear roller assembly such that the roller assemblies are only coupled together by the rider's body during exercise:

the front roller assembly comprising a single front wheel for engagement on a riding surface and a handgrip portion disposed on both sides of, and operatively supported from, the front wheel;

the rear roller assembly comprising a single rear wheel for engagement with the riding surface and a generally longitudinal leg support portion for directly engaging lower leg shin portions of the rider wherein the leg support portion is disposed on both sides of, and operably supported, from the rear wheel.

16. The wheeled apparatus of claim 15 wherein the rear roller assembly comprises a leg strap for securing the lower leg shin portion to the leg support portion.

17. The wheeled apparatus of claim 15 wherein the rear roller assembly comprises a knee pad disposed on a forward portion of the leg support portion for engaging a knee of the rider.

18. The wheeled apparatus of claim 15 wherein the rear roller assembly comprises a rear wheel brake.

19. The wheeled apparatus of claim 15 wherein the front roller assembly comprises a front wheel brake.

20. The wheeled apparatus of claim 15 wherein the rear roller assembly comprises a frame supported from the rear wheel, and the longitudinal leg support portion comprises a stretched fabric portion attached to the frame of the rear roller assembly.

\* \* \* \* \*